US009908290B1

(12) United States Patent
Clayton (10) Patent No.: US 9,908,290 B1
(45) Date of Patent: Mar. 6, 2018

(54) CONFIGURABLE PRINTERS

(71) Applicant: Richard A. Clayton, Simi Valley, CA (US)

(72) Inventor: Richard A. Clayton, Simi Valley, CA (US)

( * ) Notice: Subject to any disclaimer, the term of this patent is extended or adjusted under 35 U.S.C. 154(b) by 376 days.

(21) Appl. No.: 14/634,715

(22) Filed: Feb. 27, 2015

Related U.S. Application Data (60) Provisional application No. 61/945,679, filed on Feb. 27, 2014, provisional application No. 62/007,805, filed on Jun. 4, 2014.

(51) Int. Cl.
| | |
|---|---|
| *B29C 64/124* | (2017.01) |
| *B29C 67/00* | (2017.01) |
| *B29C 64/20* | (2017.01) |
| *B29C 64/386* | (2017.01) |
| *B29K 105/00* | (2006.01) |
| *B33Y 30/00* | (2015.01) |
| *B33Y 50/02* | (2015.01) |

(52) U.S. Cl.
CPC ........ *B29C 67/0062* (2013.01); *B29C 64/124* (2017.08); *B29C 64/20* (2017.08); *B29C 64/386* (2017.08); *B29C 67/0085* (2013.01); *B29C 67/0088* (2013.01); *B29K 2105/0058* (2013.01); *B33Y 30/00* (2014.12); *B33Y 50/02* (2014.12)

(58) Field of Classification Search
CPC ............ B29C 67/0062; B29C 67/0088; B29C 67/0085; B33Y 50/02; B33Y 30/00; B29K 2105/0058
USPC ................... 425/150, 97, 385; 264/405, 497
See application file for complete search history.

(56) References Cited

U.S. PATENT DOCUMENTS

| | | | | |
|---|---|---|---|---|
| 2009/0177309 A1* | 7/2009 | Kozlak | ............... | B29C 67/0051 700/119 |
| 2011/0089610 A1* | 4/2011 | El-Siblani | ........... | B29C 67/0085 264/401 |
| 2013/0242317 A1* | 9/2013 | Leavitt | ................ | B29C 67/0055 358/1.8 |
| 2016/0144570 A1* | 5/2016 | Kim | .................... | B29C 35/0805 425/174.4 |

OTHER PUBLICATIONS

Shane Taylor. Lots of "Z's" Around this Week—This One is Zmorph. Sep. 12, 2013. 3D Printing Industry.*
Another personal fabricator: Zmorph 3D printer & milling machine. Sep. 9, 2013. 3Ders.org.*

\* cited by examiner

*Primary Examiner* — Matthew J Daniels
*Assistant Examiner* — Leith S Shafi (57) ABSTRACT

Three dimensional printing or additive manufacturing apparatus for creating two dimensional "slices" of a three dimensional object, with successive slices built up in the third dimension to form the three dimensional object. The printing apparatus may include selectable or interchangeable print head apparatus to support multiple modes of slice formation. To facilitate multiple formation methods the apparatus may include multiple interchangeable build surfaces, preferably having common physical interface features for ease of swapping, and otherwise having differing characteristics as appropriate for the individual formation or building modes.

20 Claims, 10 Drawing Sheets

CONFIGURABLE PRINTERS

RELATION TO COPENDING PATENT APPLICATIONS

This patent application claims priority to U.S. Provisional Patent Application No. 61/945,679 filed Feb. 27, 2014, and to U.S. Provisional Patent Application No. 62/007,805 filed Jun. 4, 2014, both of which are hereby incorporated by reference in their entirety. In the event of conflict or contradiction, the immediate content of the present application shall take precedence.

FIELD

This disclosure is generally directed to three dimensional (3D) printing or additive manufacturing, with particular focus on the technologies of extrusion based "fused deposition" printing and light activated stereolithography or SLA

BACKGROUND

The terms "three dimensional printing", "3D printing" and "additive manufacturing" are generally applied to technologies or processes through which three dimensional objects are formed by incrementally adding relatively minuscule amounts of material in a controlled manner. Such processes typically involve converting a 3D computer model of an object into a collection of thin cross-sectional "slices" which are then physically produced in sequence, one upon another, to form the object. Each slice represents a planar section but has a small depth in the third dimension. The smaller that depth is made in the slicing process, the more accurate the produced object will be, provided the physical process is capable of the required resolution. The apparatus that carries out the physical process of such additive building is commonly referred to as a three dimensional printer. Common technologies for three dimensional (or 3D) printing include extrusion of melted plastic or other suitably pliable material onto a build surface (fused deposition modeling or fused filament fabrication), photocuring layers of liquid resin to form solid sections on a build surface within a bath of resin (stereolithography), and binding, sintering or melting together particles of a powder on a build surface within a bed of powder (binder jet, selective laser sintering, selective laser melting).

In extrusion 3D printing, a melted plastic, or other material of similar or suitable consistency, is extruded through a nozzle in close proximity to the surface of a build platform. The nozzle is held from the platform's build surface at a distance equaling the slice depth, and is relatively moved parallel to the plane of the surface to trace an image of the slice. Thus, in the case of plastic extrusion, the slice is drawn on the build surface in molten plastic. The plastic is allowed to become firm, the build platform and nozzle are further separated by the thickness of the next slice, and the next slice is likewise drawn upon the first. The process is repeated until the entire object has been built.

In stereolithography, a light source is used to trace or project an image of a slice onto a surface of a photo-curable liquid, whereby the light energy of the image causes a thin layer of liquid to transform into a solid image of the slice. The first slice is formed against the surface of a build platform that then moves the slice away from the light projector by a distance equaling the depth of the next slice. The process is repeated to form a second slice against the surface of the first slice, and so on, until the entire object has been produced.

In selective laser sintering or melting, a high powered laser is used to trace slice images onto a thin layer of powdered raw material spread over a build surface, causing the heated particles to become joined. The build surface is then lowered and another layer of powder is spread over the first, and the process is repeated. Binder jetting likewise uses a bed of powder spread over a build assembly, but instead of heating the powder to join the particles, ink jets apply a binding fluid in the image of each slice.

The above descriptions are simplistic, and as 3D printing has advanced beyond its 1980s origins many technological enhancements have been made for tightly controlling the processes and variables involved, to provide solutions for demanding industrial applications. The resultant industrial machines are highly sophisticated, complex and expensive. More recently, less elaborate devices that operate on the same basic principles have become of interest to hobbyists, product designers, engineers and other consumers. The majority of devices in this class are machines based on plastic extrusion, but several designs have been published or marketed for hobbyist and consumer grade stereolithography systems with laser diodes or digital light processing (DLP) projectors employed as the transformational energy source.

SUMMARY

The disclosed printing apparatus provide practical means and methods for economically enabling a single device to produce objects via multiple methods, such as stereolithography and plastic extrusion, or such as top projection and bottom projection stereolithography. The printing devices may employ multiple or interchangeable print heads for different build technologies and may employ multiple or interchangeable build platforms or assemblies adapted to allow one build surface positioning system to accommodate divergent requirements or characteristics of multiple build technologies or processes.

This summary is provided to introduce a selection of concepts that are further described below in the detailed description. This summary is not intended to identify key or essential features of the claimed subject matter, nor is it intended to be used as an aid in limiting the scope of the claimed subject matter.

DETAILED DESCRIPTION

Figure 1:
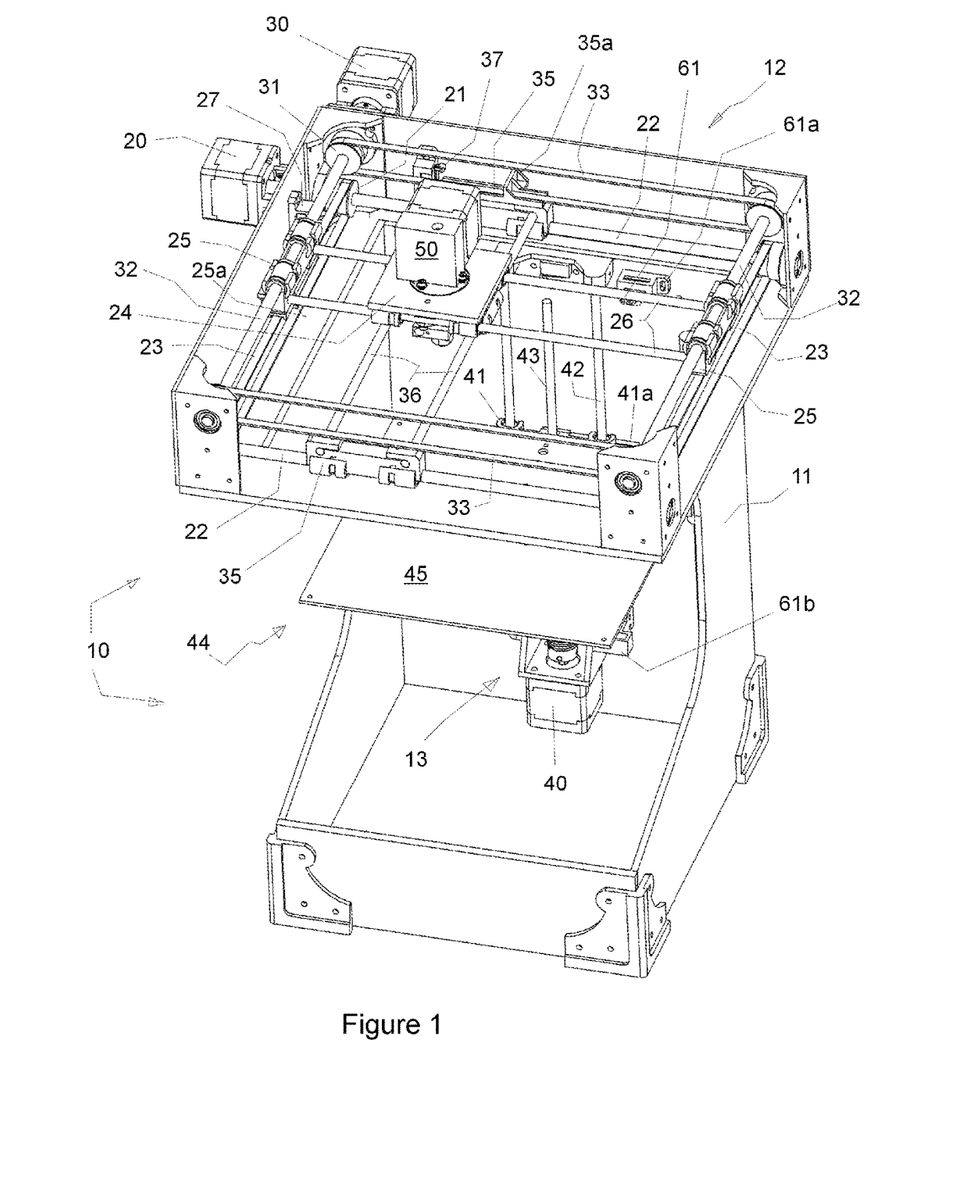
FIG. 1 illustrates a 3 dimensional (3D) printer as disclosed herein, configured to build objects with a plastic extrusion process.

FIG. 1 shows by way of illustration and not of limitation a 3D printer apparatus 10, having a frame 11, a two axis motion mechanism or system 12 and a one axis motion mechanism or system 13 for motion in a third axis.

The two axis motion system 12 is of a somewhat standard Cartesian format in which a first stepper motor 20 in conjunction with pulleys 21, rods 22 and belts 23 moves a carriage 24 in alignment with a first axis, referred to hereinafter as the x axis or direction, and a second stepper motor 30 and associated pulleys 31, rods 32 and belts 33 move the carriage in alignment with a second axis, perpendicular to the x axis and hereinafter referred to as the y axis or direction. Belts 23 and 33 each loop around a pair of pulleys and attach to bearing assemblies 25, 35 respectively. The bearing assemblies 25, 35 slide along rods 32, 22 respectively. Rods 26 move with bearing assemblies 25 to drive the carriage 24 in the x axis, and rods 36 move with bearing assemblies 35 to drive the carriage 24 in the y axis. Switches 27, 37 in combination with switch actuating bearing assembly projections 25a, 35a serve to sense initialization travel of the xy carriage 24 to its predetermined "home" positions in the x and y directions, respectively. Mechanical switches are illustrated, but other sensors may be used, such as Hall effect or optical devices. Any other motion system for positioning a tool in two dimensional space may be substituted, such as a polar system for example.

The third axis motion system 13 includes a stepper motor 40 that moves a carriage 41 along rods 42 via a lead screw 43, in alignment with a third axis (hereinafter "z" axis or direction) orthogonal to the xy plane. The z axis lead screw arrangement may be replaced with a belt and pulley mechanism similar to that of the x or y axes, or vice versa, or other mechanisms suitable for similar motion may be substituted. A switch 61 in combination with a switch actuating projection 41a of the z carriage 41 serves to sense initialization travel of the carriage to its home position.

With respect to travel sensors and home positions, the sensors for each axis such as switches 27, 37 and 61 may be arranged as depicted in the present illustrations, such that carriages 24 and 41 cannot move more than a small distance beyond the actuation point of the switch or sensor, due to physical interference between the switches and their actuating devices, or the sensors may be arranged such that the carriages actuate the sensors but are not physically prevented from moving beyond the actuation points. In either arrangement, the actual stopping of motion will typically be controlled by firmware or software in response to actuation of the sensor. The actual stopping point may be a preset or calculated distance beyond the actuation point of the sensor, if the physical arrangement allows such travel, whereby positioning of the carriage in its home position is transitory.

The actual stopping point may optionally be used to establish a point of reference for subsequent motions, with such motions and point of reference being nonetheless relative to the home position. In arrangements where sensors do not physically impede carriage travel, an axis may be provided with multiple sensors to allow multiple actuation points which may be selectable for homing the axis at different positions.

The carriage position at which a homing sensor is actuated may be anywhere within the travel range of the carriage, with software or firmware offsets being calculated to compensate for the amount of physical offset, if any, from a desired initial printing position. Means may be needed for determining to which side of a sensor the carriage is initially positioned, so that it will be driven toward the sensor during a homing operation. The sensor actuation point is typically used to provide a reference from which all other movements are calculated, based on known quantities such as total travel range, the reference point's position within the travel range, motor steps per distance traveled, etc. While other schemes may be employed, it is common to place a homing sensor, e.g., a switch, at one end of an axis' carriage travel range and to program the axis control software or firmware to drive the carriage toward that end when a homing operation is commanded. In that way, no matter where in its range the carriage initially is, it will eventually actuate the sensor and establish a reference point or "home". Any subsequently commanded movements will place the carriage in a relative position that may be referenced or traced back to its initial home position. While it is possible to "home" or initially position a system manually, e.g., by moving or driving a carriage and any attached objects to a physical stop such as an end of the carriage's travel range, and to base subsequent programmed movements on the assumption that the carriage started in the desired "home position", it is preferred, but not required, to use a homing sensor, along with suitable initialization programming.

References herein to "home position" generally relate to the initial positioning of a carriage to establish a point or frame of reference for subsequent movements (or for subsequent establishment of relative points or frames of reference) but the home positions of other objects may also be referenced or described. The "home position" of a specified object generally means the position of that object when a carriage to which it is connected is also in a home position. In such cases where a homing sensor is used, references herein to "home position" thus generally indicate the position of a specified object at the point of the sensor being actuated. For example with reference to FIG. 1, "the home position of z carriage 41" would refer to the position carriage 41 is in when projection 41a actuates switch 61, whereas "the home position of build assembly 44" refers to the position of build assembly 44 when projection 41a actuates switch 61, and "the home position of build surface 45" refers to the position of surface 45 when projection 41a actuates switch 61, etc. Capabilities may be included for adjustment of such positions, typically for system alignment.

Figure 2:
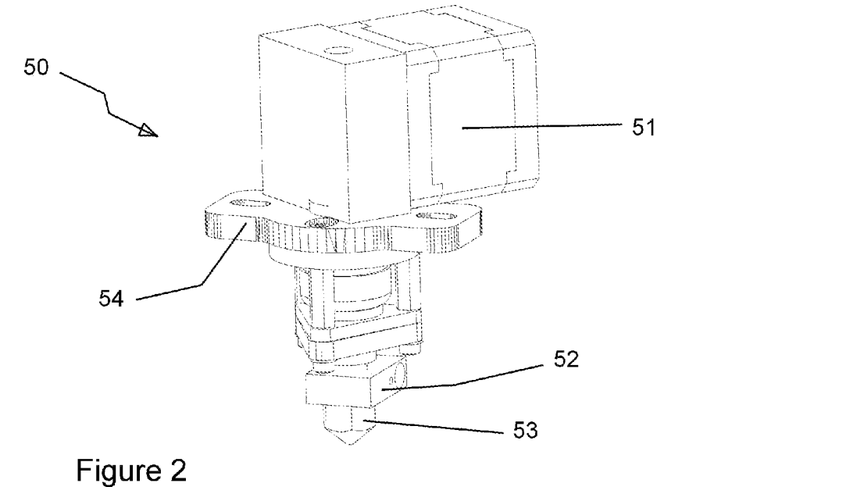
FIG. 2 illustrates a plastic extrusion print head that can be used in the printer configuration of FIG. 1.
Figure 3:
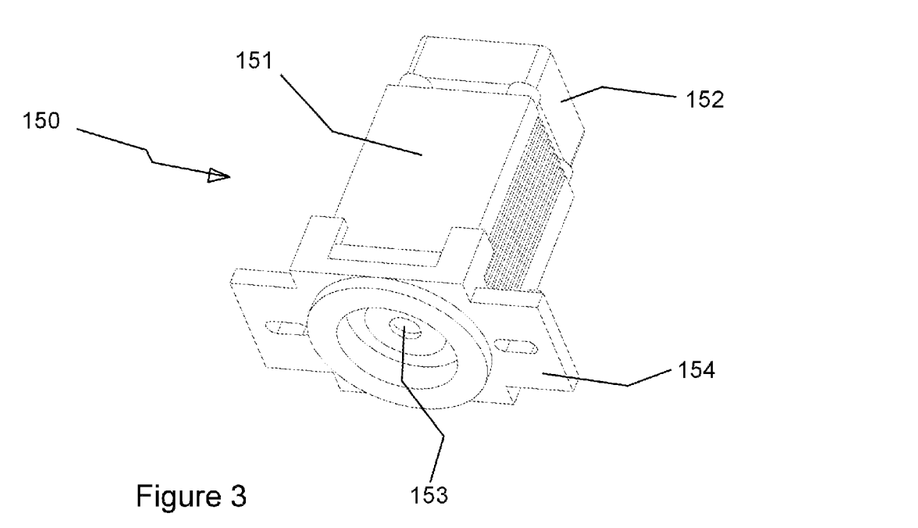
FIG. 3 illustrates a laser print head that can be used in the printer configuration of FIGS. 6 & 8.

The xy carriage 24 is adapted to receive a print head 50, which may also be referred to as a tool, tool head or the like. The print head may include a material extruder or an energy projector such as a laser, and is removable to allow different print heads or tools to be selectively employed. Alternatively, the carriage 24 may be adapted to carry multiple print heads simultaneously, or the printer may include more than one xy carriage, as is known in the art. In the presently described embodiment, the carriage 24 holds one print head. As depicted in FIGS. 1 & 2 the print head 50 is an extrusion head having a stepper motor 51, a filament heater block 52, a nozzle 53 and a mounting flange 54 adapted to mate with the xy carriage 24. The stepper motor 51 drives a plastic filament into a melt chamber within the heater block 52 and the resulting pressure extrudes molten plastic from the nozzle 53. The printer's control system treats the linear feed of filament as another axis (hereinafter the "e axis"). A laser print head 150 is shown in FIG. 3 and in this illustration includes a housing/heatsink 151 for containing a laser diode module, a cooling fan 152, a beam output opening 153 and a mounting flange 154 similarly adapted to mate with xy carriage 24. A wiring harness (not shown) provides power and other electrical connections to the print head via mating connectors (not shown) that may be free to move with the harness or may be affixed to or integrated into the carriage and print head.

Figure 4:
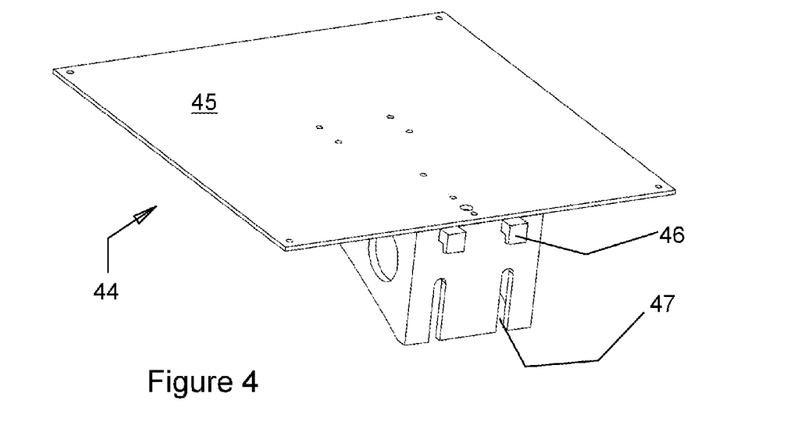
FIG. 4 depicts a build assembly that can be used in the printer configuration of FIG. 1.

The z carriage 41 is adapted to receive a build assembly 44, which is depicted in greater detail in FIG. 4. In the present application the terms "build assembly", "build platform", "build plate" and "build surface" are used to describe components of three dimensional printers. It is noted that "build surface" refers to a surface upon which a three dimensional object is formed in the printing process, with an initial layer of the object being formed directly against the surface. "Build plate" generally refers to a three dimensional component that includes a face or surface that functions as a build surface. "Build assembly" refers to a component having a build surface and associated support structure that in general supports the build surface on a motion system of the printer. References to such support structure may include structural contributions of a build plate or the like in supporting a build surface. "Build platform" is used herein primarily as a synonym of "build plate" as should be apparent in context, but in some instances may refer more generally to a build assembly. In the Figures and detailed descriptions, single reference numerals are used to interchangeably indicate and describe both build plates/platforms and their corresponding build surfaces, which should again be apparent in context. It is therefore to be understood in context that references to printing, or positioning for printing, or the like, on or of a build assembly, platform or plate indicate that the actual formation of an initial slice of an object occurs on the effective build surface of that assembly, platform or plate, and any associated positioning or the like of a build assembly, platform or plate for printing is intended to ultimately address the positioning requirements of the build surface with regard to successful formation of a printed object thereon.

The build assembly 44 includes a build platform 45 and may include electrical components such as a heating element and a temperature sensor. Electrical connections are provided between the main printer assembly and the build assembly by a wiring harness (not shown) through mating connectors (not shown). The build assembly is removable to allow different types of build assemblies to be selectively used. The build assembly 44 depicted in FIG. 1 is configured for use with an extrusion based print head, but is not suitable for immersion in a vat of liquid resin as would be necessary for use with a stereolithography projection head.

Figure 5:
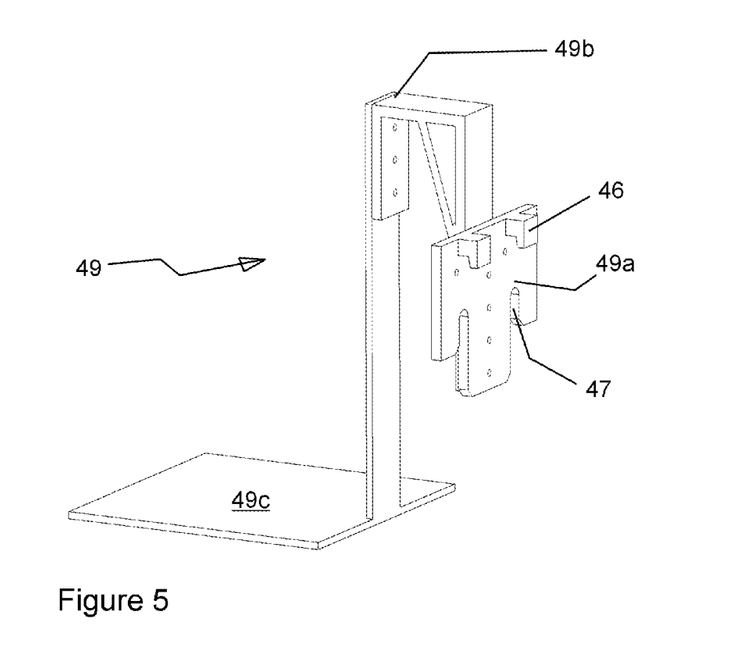
FIG. 5 depicts a build assembly that can be used in the printer configuration of FIG. 6.
Figure 6:
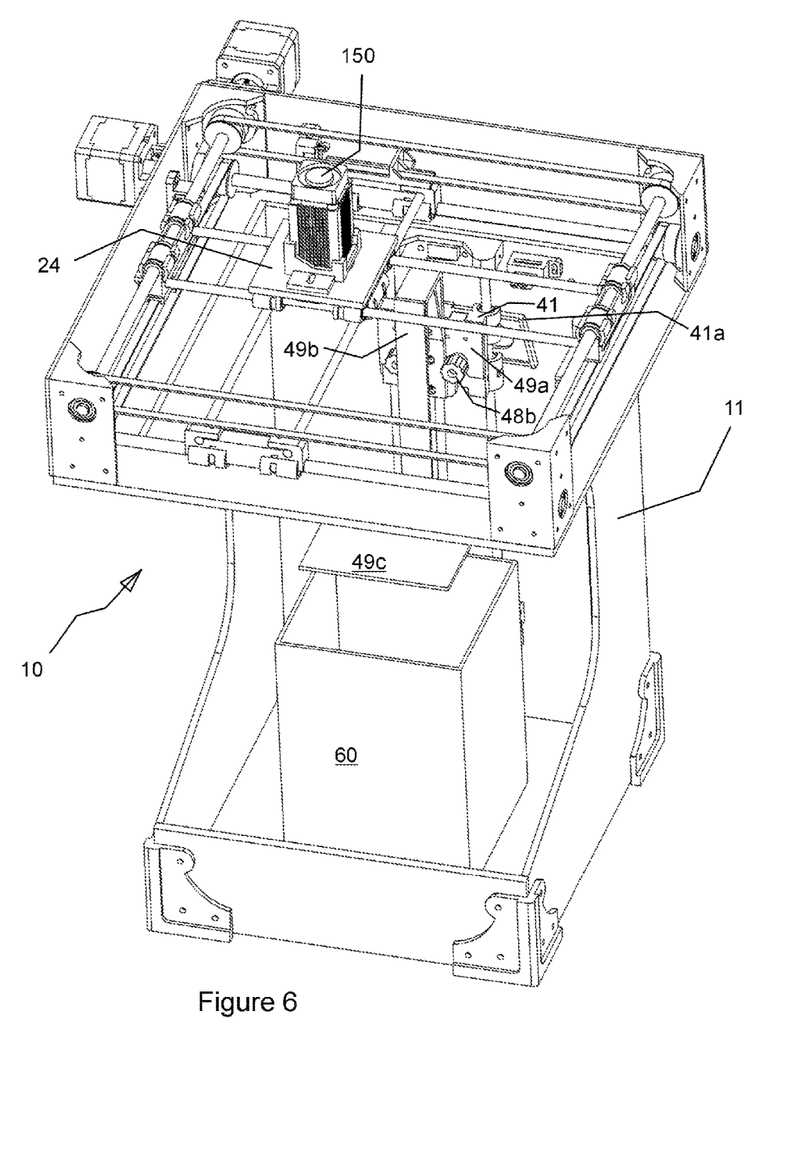
FIG. 6 illustrates a 3D printer as disclosed herein, configured to build objects through stereolithographic curing of resin.
Figure 7:
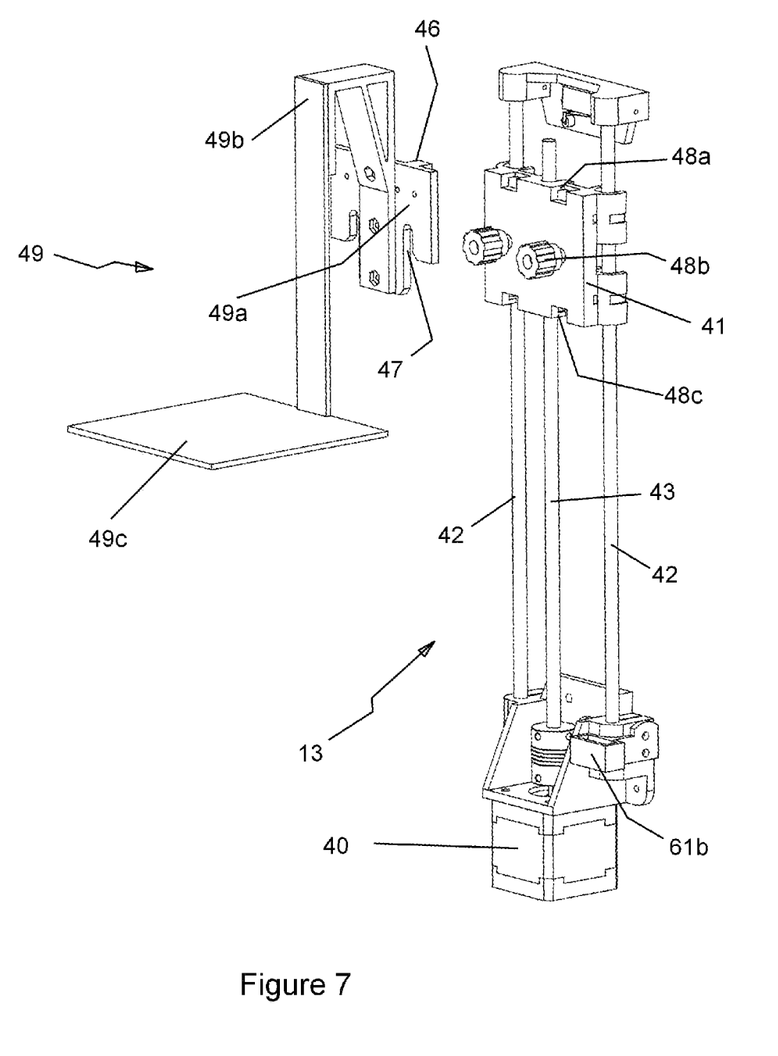
FIG. 7 illustrates details of the z axis motion system and build assembly of the printer depicted in FIG. 6.

To make the printer useable for SLA 3D printing, a different build assembly 49 may be connected to the z carriage 41, as illustrated in FIGS. 5, 6 & 7. Both build assemblies 44 and 49 include retaining tabs 46 and slots 47 adapted to interchangeably mate with sockets 48a and thumbscrews 48b (ref. FIGS. 6 & 7) of the z carriage 41. Details of the z carriage 41 are illustrated in FIG. 7. Thumbscrews 48b are vertically centered and a lower pair of sockets 48c is provided to allow build assemblies in different configurations to attach from above or below the z carriage 41. Thus, the various build assemblies may, as illustrated in the referenced figures, include common interface structure that enables their attachment to a single receiving structure, or receiver, of the z carriage. The illustrated build assemblies are physically interchangeable with one another in their attachment to the z carriage, but in other aspects have different forms that provide different functional structures or characteristics adapted for their intended build modes in the printing apparatus.

Referring to FIG. 6, a vat or container 60 for holding photo-curable liquid resin is placed inside the printer frame 11, and a laser print head 150 is installed on the xy carriage 24. The build assembly 49 includes a horizontal and vertical extension 49b between the carriage mating portion 49a and the build platform 49c. The build assembly is best understood with reference to FIG. 5. The extension 49b serves two purposes: first, it is dimensioned to place the build platform close to the focal length of the laser print head when the z carriage is at its highest printing position; secondly, the horizontal and vertical members of the extension 49b provide clearance between the build assembly and the vat wall as the build platform is lowered toward the bottom of the vat, via the z carriage 41.

In making the z axis assembly compatible with both an extrusion system and a stereolithography system it is necessary that the interchangeable build assemblies 44 (extrusion) and 49 (stereolithography) both can be homed (when mounted on the z carriage 41) without physical interference from the xy system. It is also important that in normal operation the build assemblies don't collide with other system components, but this can be addressed with configuration specific software/firmware travel limits once the z carriage has been homed to establish the needed frame of reference for further motion commands. The homing operation itself is performed without any frame of reference, so the build assemblies must be physically incapable of interferences during that time. Addressing this requirement can be challenging since the form factors of the build assemblies required for extrusion printing and SLA printing typically are substantially different, as are their orientation and utilization of space within the frame of a printer, the relative distances between their respective build surfaces and print heads, and the amount of vertical travel in each direction that will or won't result in crashing the build assembly into other components of the system. In the presently described and illustrated embodiments this is accomplished using a single z axis homing switch 61 which is actuated by the z carriage 41/41a at a single home position, in either extrusion or SLA configuration. The z travel limit in the direction of the xy assembly 12 is set in firmware to be identical to the home position, so the z carriage 41 can move no closer to the xy assembly once it has been homed. Both build assemblies 44, 49 are designed such that when they are mounted and correctly aligned on the z carriage their constituent components can not extend (upward in FIGS. 1 & 6) beyond the level of any xy system components in vertical alignment with them, or pass vertically into the horizontal paths of any such xy components.

With reference to FIGS. 1 & 2, the extrusion build assembly 44 is designed and constructed so that when properly mounted and aligned on the z carriage 41 at home position, its build surface 45 lightly touches the tip of extrusion nozzle 53. With reference to FIGS. 5 & 6, the SLA build assembly 49 is designed and constructed so that when it is properly mounted and aligned on the same z carriage 41 in the same home position it's highest component, the top of the horizontal member of extension 49b, is slightly lower than the x axis bearings of xy carriage 24, which is the lowest part of the xy assembly 12 that can come into vertical alignment with the build assembly 49. Thus the system can be safely homed and initialized with either the extrusion build assembly 44 or the SLA build assembly mounted on the z carriage 41, provided the system is otherwise appropriately configured for extrusion or SLA, respectively.

In the presently illustrated embodiment, it may be possible for the SLA build assembly extension 49b to contact the extrusion nozzle 53, if the two were simultaneously installed, but there is no functional reason for such an installation. In order to obviate the possibility for damage from an accidental combination of this kind the extruder may be mounted higher, or the SLA extension 49b may be made slightly lower relative to the z carriage. Means to electronically detect which hardware components are installed may also be incorporated along with software interlocks to prevent motion if incompatibilities are detected.

When properly mounted and aligned in the single home position as has been described above, both the extrusion build assembly and the SLA build assembly are ready for printing. In the case of extrusion printing, a print file will typically command the z axis to drop by one slice thickness and then extrusion will begin with the build platform 45 thus positioned slightly below the nozzle 53. In the case of SLA printing, typical pre-print preparations will include installation of a sufficiently tall or raised vat, sufficiently filled to place a surface of photo-curable resin just at the top side of build platform 49c. A print file will typically command the z axis to drop by one slice thickness and then printing will begin with the build platform 49c thus positioned slightly below the resin surface.

Note that FIG. 6 depicts a relatively short version of the build assembly 49 and a relatively short vat 60, primarily for purposes of illustration so that the build platform 49c is not obscured by the vat. As depicted in FIG. 6, the z build assembly would not be entirely ready for printing when homed to switch 61, as its platform 49c is well above vat 60 and thus not near the resin surface within. However, the system is still usable with such a configuration. An offset can be included in a print file's z axis commands to compensate for the gap between the homed position of platform 49c and the resin surface within the vat. Such an arrangement may in fact be desirable to provide easier access to the build platform, but at the expense of some z direction print capacity.

Print capacity in the z direction can be generally maximized by dimensioning the vertical member of extension 49b and the vat 60 to place both the build platform 49c and the resin surface near the midpoint of the z carriage travel range, with the vat walls being dimensioned not much higher than the resin surface, as they will at some point block the horizontal member of extension 49b and thus limit how low the build platform 49c can be positioned. The absolute maximum possible build height will be approximately one half of the vertical space from the horizontal member of extension 49b to the bottom of the printer frame 11, reduced by other factors such as the height of the vat walls above the resin surface, the distance between the vat bottom and the build platform 49c at its lowest position, and the thicknesses of the printer bottom frame/cover (if any), the bottom of vat 60, the build platform 49c and the horizontal member 49b.

The print height limitations due to height of the vat walls above the resin surface can be mitigated to some extent by rearrangement of the relationship between the z axis assembly and the xy assembly, such that the z carriage 41 is positioned farther back, outside of the rearmost y axis rod 22. In this construction the build assembly extension 49b may be freed to extend higher than the previously limiting xy components, and thus may be made taller to allow for extension into a deeper vat. A tradeoff, however, is that the vat will likewise need to extend farther back with respect to the print range of the xy assembly, to accommodate the position of the extension 49b, and there will consequently be an added amount of unprintable horizontal space within the vat and resin supply.

Figure 8:
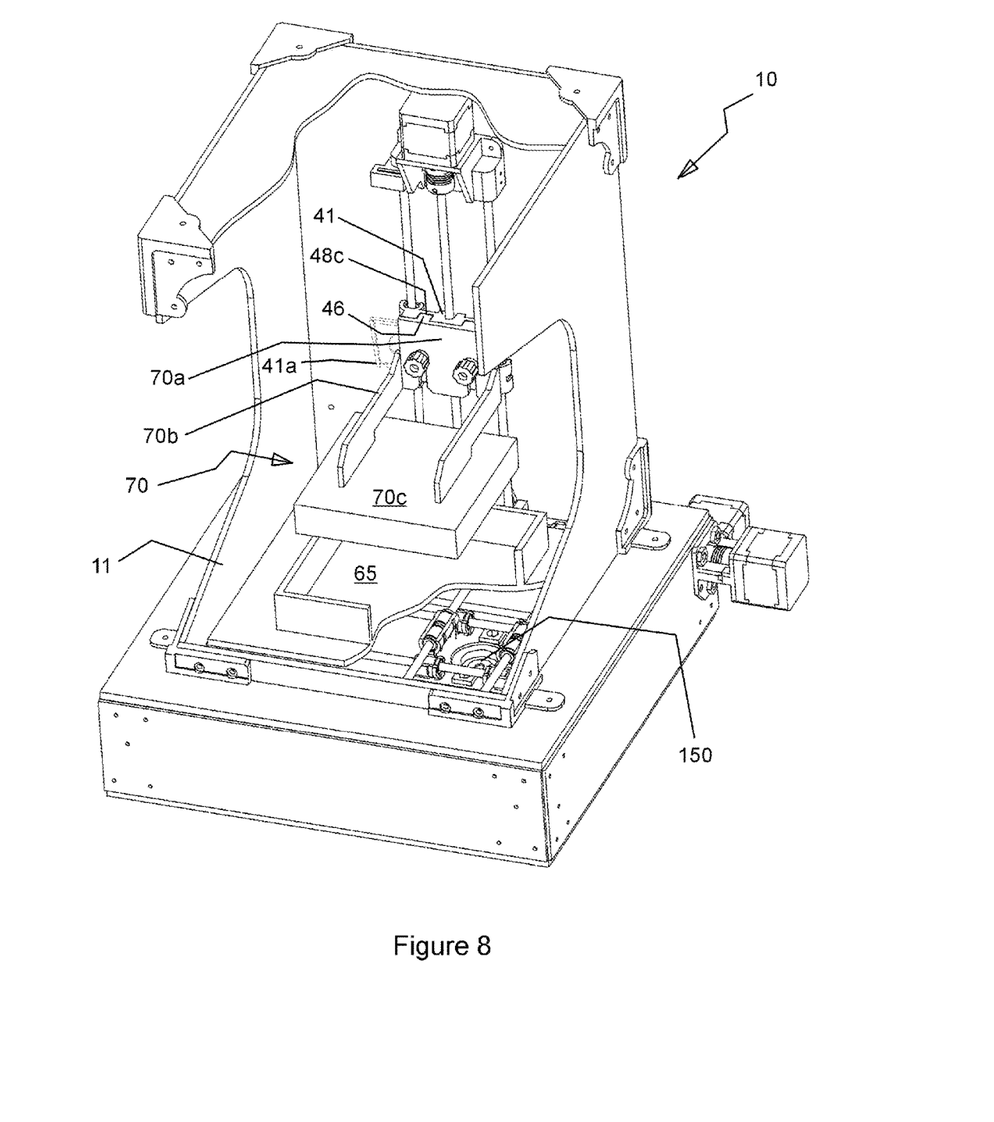
FIG. 8 illustrates the printer of FIGS. 1 & 6 configured for "bottom projection" stereolithographic operation.
Figure 12:
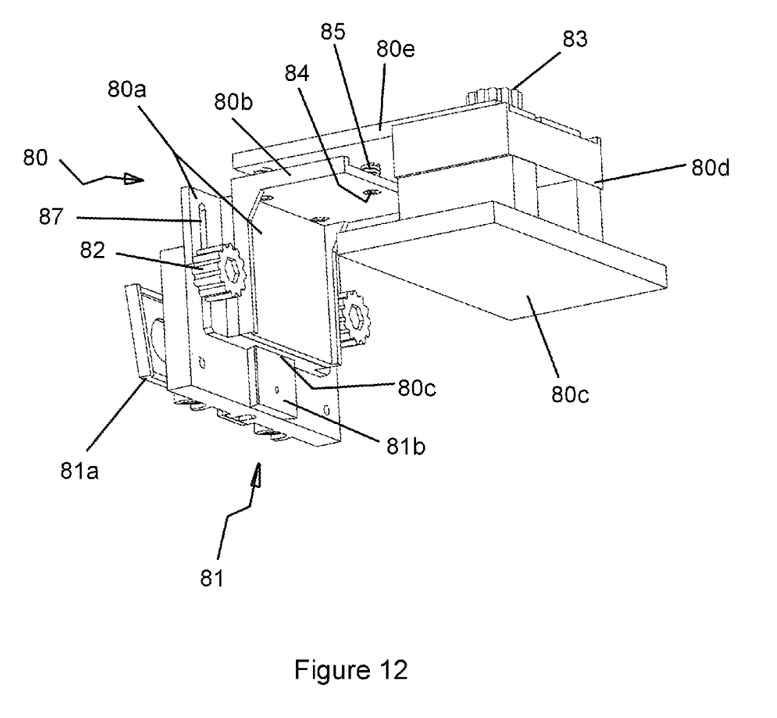
FIG. 12 illustrates an alternative z axis carriage and build assembly combination for use with the printer of FIG. 8.

With reference to FIG. 8, the printer may be inverted and reconfigured for SLA printing modes in which the laser or other light source projects through the transparent bottom of a vat or container 65 to form slices of an object on the underside of a build platform 70c. This presents additional requirements for multiple build assembly compatibility because the vat is now between the build assembly and the xy assembly, and the build assembly is homed toward the vat (assuming the same homing direction and switch 61 are used as for build assemblies 45 and 49.) As depicted in FIG. 8 the platform 70c will collide with the vat if the previously described z carriage projection 41a is relied upon to trigger homing switch 61, because the build assembly 70 as configured will cross the plane of the vat bottom before the z carriage 41 can reach its normal home position. To address this incompatibility a new switch actuator (not shown) that extends beyond the original actuator 41a may be incorporated into structure of the build assembly 70 to contact and actuate the homing switch 61 at a different z carriage position. In other embodiments each build assembly might include a switch actuator, adapted to its specific positioning needs. Alternatively, the system may incorporate a second homing sensor that is selectively employed during this mode of operation, to be actuated at a different z carriage position by the original switch actuator 41a, or the build assembly 70 may be reconfigured to position the platform 70c and its supports 70b higher relative to the carriage mounting plate 70a, so that the build platform 70c is in correct vertical alignment with the vat 65 when the z carriage is in its original home position. FIG. 12, which will be described in greater detail further herein, illustrates such an alternative configuration for the z carriage and build assembly combination of FIG. 8.

Figure 9:
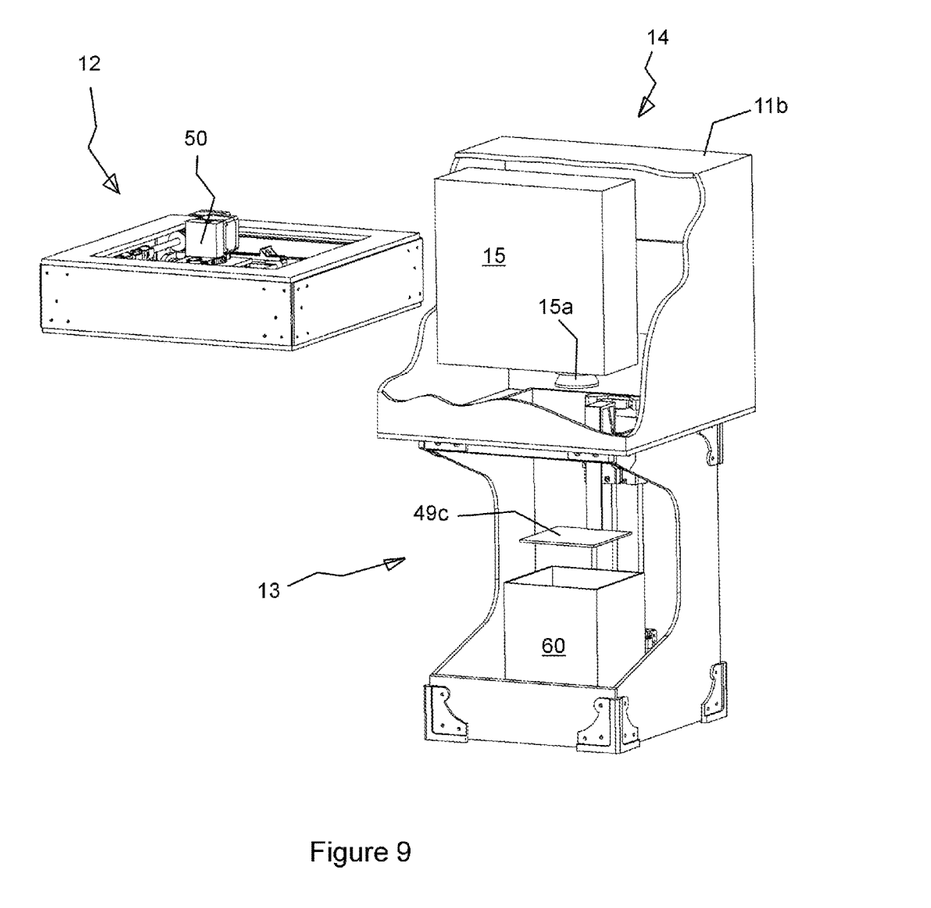
FIG. 9 illustrates a 3D printer as disclosed herein, similar to that of FIGS. 1, 6 & 8, and wherein the xy module can be replaced with a digital light processing (DLP) projector module for stereolithographic operation.
Figure 10:
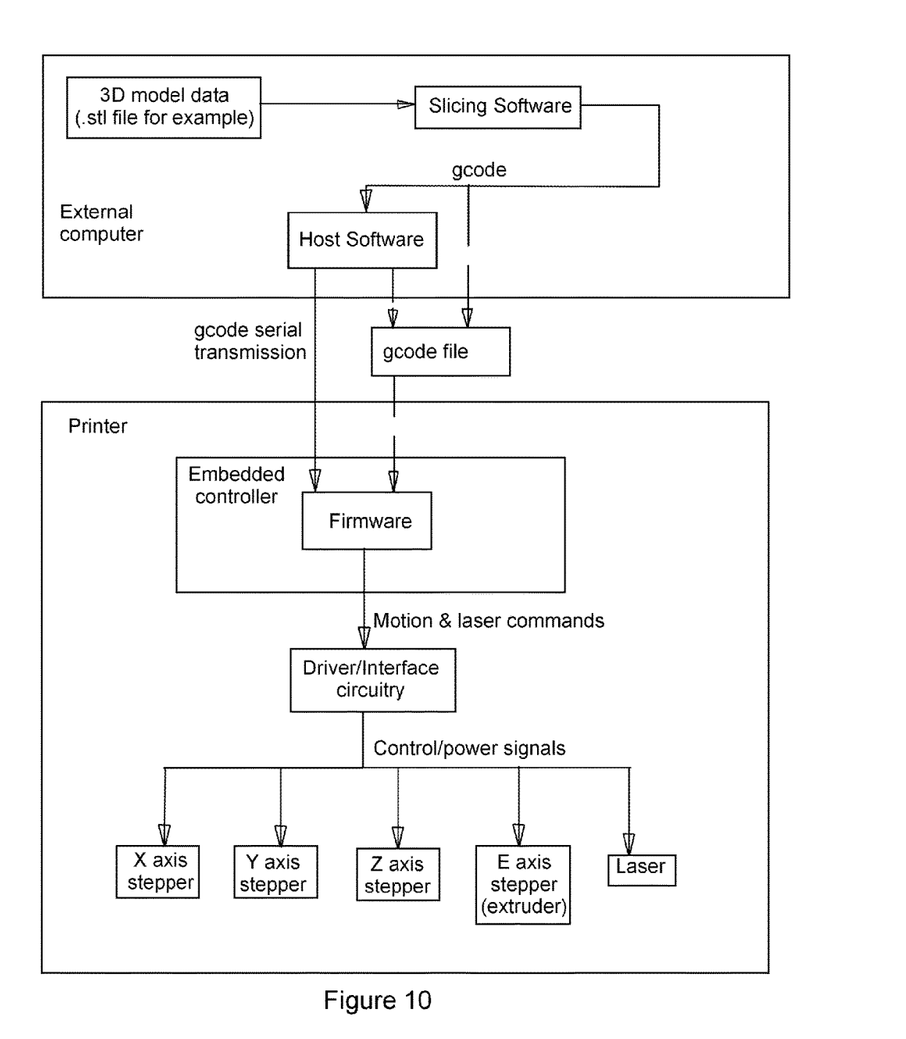
FIG. 10 is a flow chart depicting a generalized process flow for a 3D printer as disclosed herein.
Figure 11:
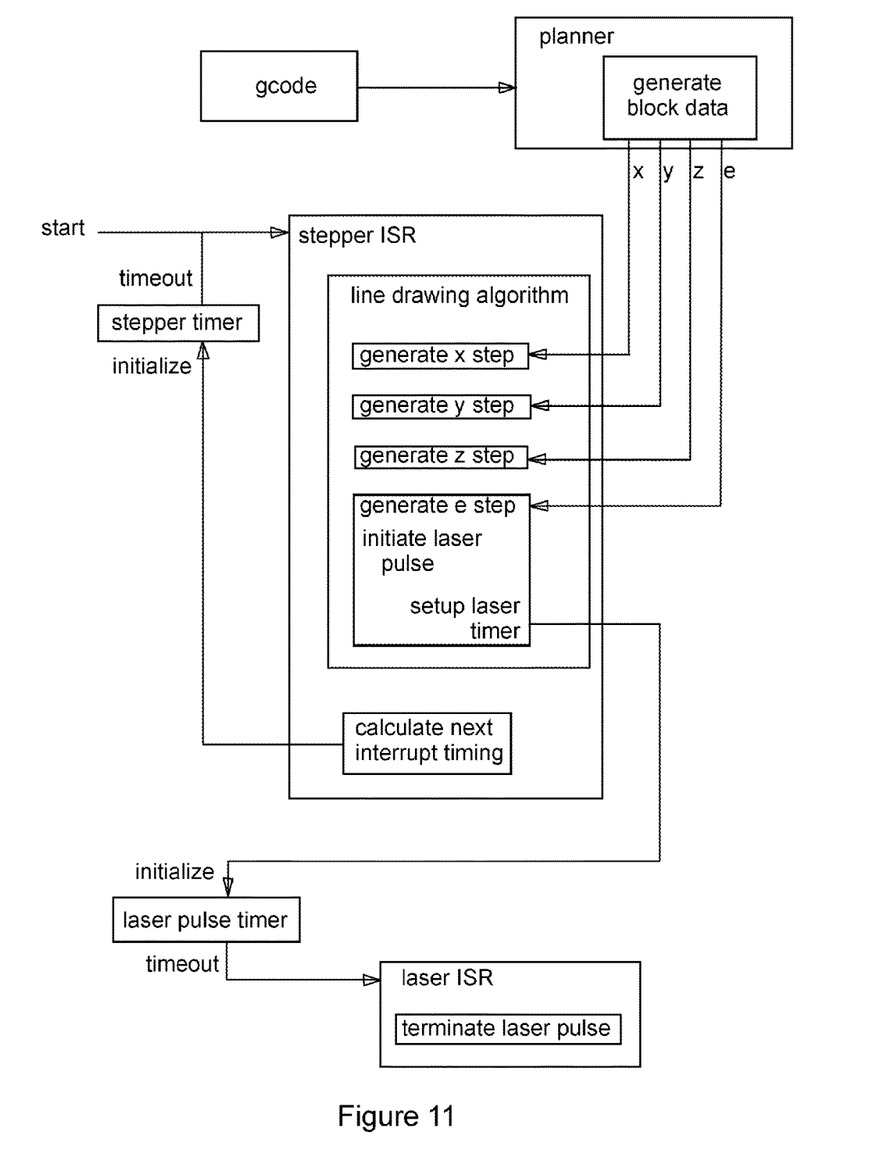
FIG. 11 is a diagram generally depicting a method for output control of a laser print head in a 3D printer as disclosed herein.

The various build assemblies that have been described each extend to different distances from the z carriage 41 toward the z axis stepper motor 40 and its associated mounting structure (corresponding to the bottom of the printer in FIGS. 1 & 9, and the top of the printer in FIG. 8.) Thus there is not a common maximum safe travel limit in that direction along the z axis, among the different configurations. The system may be designed or otherwise programmed to limit z travel to the smallest common safe travel range, which in the present illustrations is that of the SLA configuration in FIG. 6, or, to allow optimal usage of build capacity the system may be designed or otherwise programmed with a plurality of maximum travel limits to be selectively employed as appropriate for any given configuration.

In general, for such combinations of extrusion and SLA printing technologies to be practical, provisions must be made to ensure that the extrusion build surface can be positioned suitably close to the extrusion nozzle for successful printing of an initial layer, and that the SLA build surface can be positioned suitably close to the surface of a resin supply for printing of an initial layer. To these ends, the z axis system may be designed with multiple, selectable sensors for multiple, selectable home positions to be associated with different configurations, or the system may use multiple software/firmware controlled offsets, from a single sensor actuation point that defines home position, at which the carriage actually stops after triggering the sensor. In either case the appropriate sensor and/or offset would be selectively employed depending upon which mode of operation and build assembly is in use.

Alternatively, the z axis system may employ a single home position and single stopping position, i.e., a single sensor to establish home position and a single position (which may or may not be offset from home) at which the carriage stops after triggering the sensor. Individual extrusion and SLA build assemblies may be designed to position their respective build surfaces at effective initial layer printing heights while the z carriage is at the single home position, or at the single stopping position, or the actual z axis carriage position at which an initial layer is printed may be automatically offset from the single home position, or from the single stopping position, under the control of software/firmware. In the latter case the offset may be programmed to differ depending upon selected mode of operation, the particular build assembly being used, or upon other variable factors such as extrusion nozzle height or resin surface height. For example, in FIG. 6 the z carriage is not at the top of its travel range (note that z carriage protrusion 41a is well below the homing switch 61) and there is a large gap between the build platform 49c and the vat 60. The z carriage is at some position below home, assuming switch 61 is the only home sensor, and it may be at a software/firmware defined stopping position offset from the home trigger point of the switch. Assuming it is at a software/firmware defined stopping position, it may have already been initialized for printing, and upon receipt of a run command, a host software may move the z carriage by another offset to position the build platform 49c at a resin surface within the vat 60 prior to running a print file. In this scenario, there would be no need for the print file to include offset information, as has been previously described, but management of z axis position and travel limits becomes more complex.

It is preferable that adjustment capabilities be included in the build assemblies or elsewhere for fine tuning of build surface height. For plastic extrusion printing, as depicted in FIG. 1, the build assembly 44 is constructed and mounted so that the build plate 45 just touches the nozzle tip of extrusion head 50 when the z axis is raised enough to actuate switch 61. The switch is mounted using vertically slotted holes 61a so that the height of the z carriage at switch actuation (and hence the height of an affixed build assembly/build surface) may be adjusted. For similar or additional flexibility, an adjustment screw might be incorporated to allow fine positioning of the switch in response to turning of the screw, or an adjuster might be incorporated for the contact surface of the z carriage switch actuator 41a, to allow adjustment of the actuating position of the carriage relative to a non-movable switch.

With reference to FIG. 4, the height of the build assembly 44 and build surface 45 are further adjustable via slots 47 by manually moving the build assembly up or down relative to thumbscrews 48b, and then securing the build assembly in a fixed position by tightening the thumbscrews. Thus the height of the build surface 45 may, for example, be precisely adjusted to touch the nozzle, while the z carriage is stationary in a homed condition, which may be easier than iteratively adjusting the switch position and testing its trip point.

If the system is set up differently, e.g., for initial layer printing at an offset above home position (as would be the case if the axis were homed to the bottom with switch 61 being mounted at a lower bracket 61b) the z carriage may be set to that offset and the build assembly vertical alignment can then be adjusted as appropriate relative to the nozzle. A sliding dovetail joint (ref. FIG. 12) or similarly interlocked linear slide means may be incorporated in the interface between the build assembly and z carriage for further constraining movement to the vertical during adjustment. A manually operated lead screw and nut arrangement may be incorporated into the relatively movable components of such a joint to provide enhanced fine adjustment control.

Likewise for stereolithographic apparatus and configurations, e.g., as illustrated in FIGS. 6 to 8, the vertical alignment of the z build assemblies 49, 70 can be adjusted by loosening the thumbscrews 48b, moving the build assembly up or down via vertical slots 47 about the thumbscrews, and then resecuring the thumbscrews. Thus the build assembly 49, which as depicted in FIG. 6 requires a significant offset below the z carriage home position in order to place build surface 49c at a resin surface somewhere within vat 60, can be adjusted while at that offset position to precisely place the build surface appropriately at or near the resin surface, or to set the build surface at a precise distance from the laser head 150. In that way it will be ensured that after homing or other motion of the z axis the build platform will return in correct relation to the resin surface and/or laser upon subsequent commencement of a print operation. Similarly, the build assembly 70 of FIG. 8 may be raised or lowered via vertical slots 47 about thumbscrews 48b, as may be needed to precisely position the underside build surface of platform 70c in relation to vat 65.

Referring again to FIG. 6, the vat 60 will normally be filled with enough liquid to place a top surface of photocurable resin at about the same height as the upper or starting print position of the build platform, so that a first slice or layer of an object to be built may be formed directly on the build platform. The build assembly is depicted in a raised position, but while printing its build surface will be submerged in the vat 60. For each subsequent layer or slice, the build platform is lowered further into the vat by the thickness of the slice. The vertical dimension of the object under construction cannot exceed the depth of liquid in the vat. Note that unless otherwise identified, components of FIG. 6 are as identified in FIG. 1.

In the system of FIG. 6 the laser projects an image on to the resin surface from above. This mode of stereolithographic printing has become popularly known as "top down" printing in reference to projector orientation, while other systems similar to that illustrated in FIG. 8, that project slice images from below, have become popularly known as "bottom up" printers. However, industrial literature typically uses the term "bottom up" in reference to the object being built, so that the meaning is opposite, i.e., projection is from above and the object is built "up" from a bottom layer initially formed on the build surface. To avoid this ambiguity, the modes are referred to herein as "top projection" where the image is projected from above a vat, and "bottom projection" where the image is projected from below a vat.

FIG. 8 depicts the printer apparatus of FIG. 1 after reorientation and reconfiguration for SLA printing in a bottom projection mode, wherein the laser head 150 projects upward from below the vat to form the object upside-down on the underside of the build platform. The entire printer 10 has been inverted in this mode, with the xy motion assembly now being underneath the z axis assembly, and the previously used vat 60 has been replaced by a different vat 65. The bottom of the vat 65 is transparent to the active wavelength of the laser. In bottom projection mode, the object under construction lifts out of the vat as sequential layers are added, rather than sinking deeper into the vat with each layer. A primary advantage of this method is that the vertical build dimension is not restricted by the depth of resin in the vat, so the vat 65 can be much shallower than vat 60. The vat 65 rests on supports (not visible) at the sides of the frame 11, and a different build assembly 70 has been attached to the z carriage 41. The build assembly 70 includes a carriage mating portion 70a, extensions 70b and a build plate 70c, the underside of which serves as a build surface. As previously described, the z carriage employs vertically mirrored mating features, so with the printer 10 inverted the retaining tabs 46 of the build assembly 70 mate with receptacles 48c in what was the bottom side of the z carriage in the non-inverted configurations. It is possible to use the other SLA build assembly 49 in the inverted printer as well. The advantage in using build assembly 70 instead is that its form allows more of the vertical volume within the printer 10 to be utilized as build area. The bottom projection build mode requires only a shallow vat, so the long vertical member of extension 49b is unnecessary. With build assembly 70 almost twice as much vertical space is usable. Further toward this utilization of more vertical space the effective build surface level is closer to the laser head in this configuration that in the previous one. If a precisely focused spot size at the build surface is desired, the laser can be refocused when switching between top projection and bottom projection modes. Otherwise, the laser can be focused at a distance midway between the effective build surface levels of the two build assemblies 49, 70 so that refocusing is not necessary.

FIG. 12 illustrates an alternative z axis carriage 81 and build assembly 80 for use with the printer of FIG. 8. The carriage 81 is wider than the original z carriage 41, providing more area for mounting the build assembly, and includes a home switch actuator 81a in generally the same orientation as actuator 41a of the original carriage. The carriage 81 further includes a dovetail boss 81b for engagement with a mating slot 80c in the mounting plate 80a of build assembly 80. The build assembly may be adjusted vertically about the resulting dovetail joint and secured at a selected position by tightening a pair of thumbscrews 82. The thumbscrews pass through adjustment slots 87 in the build assembly mounting plate 80a and when tightened clamp the mounting plate 80a to the carriage 81. The build assembly 80 includes a pair of horizontal members 80b, 80e that are joined by three screws 84 and springs 85 to provide three point adjustment for leveling the build platform 80c. The platform is removably joined to the horizontal members via a vertical member 80d and thumbscrew 83. Note that in practice, if the z carriage 81 were installed in place of the original carriage 41, corresponding modifications would also be made to the mounting members of build assemblies 44 and 49 so that build assemblies for all modes of operation would have common structure for mounting to a single z carriage 81, and all build assemblies would thus be vertically adjustable about the dovetail boss 81b.

FIG. 9 illustrates another embodiment of the invention wherein the entire xy motion system 12 is modular and detachable from the z axis assembly 13, and interchangeable with a projection assembly 14 housing an image projector such as a digital light processing (DLP) projector 15. The DLP projector functions as a stereolithographic print head but does not need to be moved in the process of producing a slice image. A scanned laser projector or the like could similarly be used. In such arrangements where the entire xy assembly 12 is removed and replaced as described, the xy assembly 12 may be considered a print head that is interchangeable with another print head such as DLP assembly 14. The projector 15 may be a custom design or a commercially available unit mounted to a customized frame 11b, as is depicted in the figure. The DLP projector 15 is used to project a slice image (via lens assembly 15a) onto the surface of the photo-curable liquid in the vat 60, to form a slice on the build platform 49c. (The figure depicts the platform 49c in a raised and parked position, while in operation it will be submerged within the vat 60.) The result is essentially the same as described for the laser print head arrangement of FIG. 3, but the process differs in that the entire slice may be projected at once (if a DLP projector is used) rather than being traced point by point. Scanned laser projectors will not display an entire image at once but are generally capable of faster imaging as well. With the substitution of vat 65 for vat 60, and build assembly 70 for build assembly 49 (ref. FIG. 8), the entire assembly of z axis system 13 and DLP projector module 14 can be inverted for bottom projection use. It is also possible to adapt the DLP projector housing 11b to mount on or above the xy motion system 12, so that the DLP projector may be utilized without separation of the xy module 12 from the z module 13 or printer 10. The print head and associated rods 26, 36 of xy system 12 will preferably be parked out of the projection field of the DLP or other projector while printing in SLA modes of this type.

Although only a few example embodiments have been described in detail above, those skilled in the art will readily appreciate that many modifications are possible in the example embodiments without materially departing from the concepts as disclosed herein. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. Apparatus for additively building a three dimensional object, said apparatus including:
   a frame;
   a first motion mechanism capable of positioning a print head in two dimensions;
   a second motion mechanism capable of positioning a build surface in a third dimension;
   a first selectable or exchangeable print head positionable by said first motion mechanism;
   a first build surface removably installed to said second motion mechanism;
   said first print head and said first motion mechanism being cooperative with said first build surface and said second motion mechanism to facilitate additive building of a first three dimensional object via deposition of material from said first print head onto said first build surface to form a cross-sectional slice of said first object;

said second motion mechanism being controllable to increase the distance between said first print head and said first build surface such that successive cross-sectional slices of said first object may be similarly formed onto preceding slices of said first object;

a second selectable or exchangeable print head positionable by said first motion mechanism, said second print head being capable of projecting light;

a container for holding a raw material;

a second build surface configured to be installed to said second motion mechanism;

said second build surface having support structure including a vertical member configured to immerse said second build surface within said container;

said second print head and said first motion mechanism being cooperative with said second build surface, said second motion mechanism and said raw material to facilitate additive building of a second three dimensional object whereby light projected from said second print head causes a cross-sectional slice of said second object to form from said raw material onto said second build surface;

said second motion mechanism being controllable to increase the distance between said second print head and said second build surface such that successive cross-sectional slices of said second object may be similarly formed onto preceding slices of said second object.

2. The apparatus of claim 1 wherein:

said first build surface is a member of a first build assembly and said second build surface is a member of a second build assembly;

said second motion mechanism includes a receiver for a build assembly; and said first and second build assemblies include common structure for attachment to said receiver.

3. The apparatus of claim 1 wherein said first print head includes an extrusion nozzle and said second print head includes a laser.

4. The apparatus of claim 1 wherein:

said first build surface is a member of a first build assembly and said second build surface is a member of a second build assembly, said first build assembly includes first support structure facilitating installation of said first build surface to said second motion mechanism, and said second build assembly includes second support structure facilitating installation of said second build surface to said second motion mechanism;

said second motion mechanism including a homing sensor;

each of said build surfaces when installed having a home position associated with activation of said sensor;

a homing program being associated with and functionally cooperative with said second motion mechanism, said homing program being functional to move an installed said build surface to its said home position;

said first build assembly adapted such that said first build surface when installed in said apparatus may travel under control of said homing program to its said home position without interference from or between other elements of said apparatus, at least when said apparatus is configured for printing with said first print head;

said second build assembly adapted such that said second build surface when installed in said apparatus may travel under control of said homing program to its said home position without interference from or between other elements of said apparatus, at least when said apparatus is configured for printing with said second print head.

5. The apparatus of claim 3 wherein:

said first build surface is a member of a first build assembly and said second build surface is a member of a second build assembly, said first build assembly includes first support structure facilitating installation of said first build surface to said second motion mechanism, and said second build assembly includes second support structure facilitating installation of said second build surface to said second motion mechanism;

said second motion mechanism including at least one homing sensor;

each of said build surfaces when installed having a home position associated with activation of at least one said sensor;

a homing program being associated with and functionally cooperative with said second motion mechanism, said homing program being functional to move an installed said build surface to its said home position;

said first build assembly adapted such that said first build surface when installed in said apparatus may travel under control of said homing program to its said home position without interference from or between other elements of said apparatus, at least when said apparatus is configured for printing with said first print head;

said second build assembly adapted such that said second build surface when installed in said apparatus may travel under control of said homing program to its said home position without interference from or between other elements of said apparatus, at least when said apparatus is configured for printing with said second print head.

6. The apparatus of claim 1 wherein:

said first build surface is a member of a first build assembly and said second build surface is a member of a second build assembly, said first build assembly includes first support structure facilitating installation of said first build surface to said second motion mechanism, and said second build assembly includes second support structure facilitating installation of said second build surface to said second motion mechanism;

said second motion mechanism including at least one homing sensor;

each of said build assemblies when installed having a home position associated with activation of at least one said sensor;

a homing program being associated with and functionally cooperative with said second motion mechanism, said homing program being functional to move an installed said build assembly to its said home position;

said apparatus adapted such that an installed said first build assembly may travel under control of said homing program to its said home position without interference from or between other elements of said apparatus, at least when said apparatus is configured for printing with said first print head;

said apparatus adapted such that an installed said second build assembly may travel under control of said homing program to its said home position without interference from or between other elements of said apparatus, at least when said apparatus is configured for printing with said second print head.

7. The apparatus of claim 3 wherein:
said first build surface is a member of a first build assembly and said second build surface is a member of a second build assembly,
said first build assembly includes first support structure facilitating installation of said first build surface to said second motion mechanism, and
said second build assembly includes second support structure facilitating installation of said second build surface to said second motion mechanism;
said second motion mechanism including at least one homing sensor;
each of said build assemblies when installed having a home position associated with activation of at least one said sensor;
a homing program being associated with and functionally cooperative with said second motion mechanism, said homing program being functional to move an installed said build assembly to its said home position;
said apparatus adapted such that an installed said first build assembly may travel under control of said homing program to its said home position without interference from or between other elements of said apparatus, at least when said apparatus is configured for printing with said first print head;
said apparatus adapted such that an installed said second build assembly may travel under control of said homing program to its said home position without interference from or between other elements of said apparatus, at least when said apparatus is configured for printing with said second print head.

8. Apparatus for three dimensional printing, said apparatus including:
a frame;
a motion system capable of varying the relative distance between a build assembly and a print head;
said apparatus being configurable for three dimensional printing in different modes selectable from the group consisting at least of extrusion printing with a first print head in combination with a first build assembly or stereolithographic printing with a second print head in combination with a second build assembly;
each said build assembly including a build surface and support structure for such build surface;
said apparatus configurable for extrusion printing wherein said first print head may deposit build material onto the build surface of said first build assembly and said motion system is configured for positioning said first print head in second and third dimensions orthogonal to said first dimension;
said apparatus configurable for stereolithographic printing wherein the support structure of said second build assembly includes a member configured to immerse its build surface within a container of raw material, and said second print head is configured to project light to cause the raw material to form a cross-sectional slice of an object onto the build surface of said second build assembly;
at least one home position associated with a selected said build assembly in relation to said motion system;
said apparatus being adapted such that if said first print head and said first build assembly are selected said first build assembly may be moved to its said home position without interference from or between other components of said apparatus;
said apparatus being adapted such that if said second print head and said second build assembly are selected said second build assembly may be moved to its said home position without interference from or between other components of said apparatus.

9. The apparatus of claim 8 including initialization means that at least moves a selected build assembly to its said home position.

10. The apparatus of claim 8 wherein said second print head includes a laser.

11. The apparatus of claim 10 wherein said second print head is carried by or includes a two axis motion mechanism.

12. The apparatus of claim 8 wherein said second print head includes a digital light processing projector.

13. The apparatus of claim 8 wherein said first and second build assemblies are removable and physically interchangeable.

14. The apparatus of claim 8 wherein said first and second print heads are removable and physically interchangeable.

15. The apparatus of claim 13 wherein said first and second print heads are removable and physically interchangeable.

16. Apparatus for three dimensional printing, said apparatus being configurable for printing in at least two modes selectable from the group consisting of extrusion printing, top projection stereolithography, and bottom projection stereolithography;
wherein extrusion printing includes an extrusion print head that deposits build material on a build surface;
wherein top projection stereolithography includes a print head that projects light downward onto an upward facing build surface to cause a raw material to form a cross-sectional slice of an object on the build surface;
wherein bottom projection stereolithography includes a print head that projects light upward onto a downward facing build surface to cause a raw material to form a cross-sectional slice of an object on the build surface;
said apparatus including a frame and a motion system, said motion system being at least capable of varying in a first dimension the relative distance between a build assembly and a print head;
said apparatus including a first interchangeable build assembly, said first build assembly including a build surface and first support structure;
said first support structure having a first form configured to position the build surface of said first build assembly for printing in a first of said selectable modes, wherein said first mode is either extrusion printing or top projection stereolithography;
wherein when said first mode is extrusion printing said apparatus in said first mode uses an extrusion print head with said first build assembly, and said motion system is configured to position said extrusion print head relative to said first build assembly, in second and third dimensions orthogonal to said first dimension;
wherein when said first mode is top projection stereolithography said apparatus in said first mode uses a light projecting print head with said first build assembly, and said first support structure is configured to immerse a build surface of said first build assembly face up within a container of raw material whereby a cross-sectional slice of an object may be formed from the raw material onto said upward facing build surface of said first build assembly;

said apparatus including a second interchangeable build assembly, said second build assembly including a build surface and second support structure;

said second support structure having a second form adapted for positioning the build surface of said second build assembly for printing in a second of said selectable modes, wherein said second mode is either top projection stereolithography or bottom projection stereolithography, and wherein when said first mode is top projection stereolithography then said second mode is bottom projection stereolithography;

wherein when said second mode is top projection stereolithography said apparatus in said second mode uses a light projecting print head with said second build assembly, and said second support structure is configured to immerse a build surface of said second build assembly face up within a container of raw material whereby a cross-sectional slice of an object may be formed from the raw material onto said upward facing build surface of said second build assembly;

wherein when said second mode is bottom projection stereolithography said apparatus in said second mode uses a light projecting print head with said second build assembly, and said second support structure is configured to immerse a build surface of said second build assembly face down within a container of raw material whereby a cross-sectional slice of an object may be formed from the raw material onto said downward facing build surface of said second build assembly.

17. The apparatus of claim 16 including initialization means that may at least move an installed said first or second build assembly to a home position associated with said installed build assembly;

said apparatus being adapted such that if said first build assembly is selected it may be moved by said initialization means to its said home position without interference from or between other components of said apparatus, at least when said apparatus is otherwise configured for printing in a mode associated with said first build assembly;

said apparatus being adapted such that if said second build assembly is selected it may be moved by said initialization means to its said home position without interference from or between other components of said apparatus, at least when said apparatus is otherwise configured for printing in a mode associated with said second build assembly.

18. The apparatus of claim 16 wherein said second mode is bottom projection stereolithography.

19. The apparatus of claim 18 wherein said frame in said second mode is inverted relative to said first mode.

20. The apparatus of claim 16 including a receiver for a build assembly;

said first and second build assemblies including common structure for attachment to said receiver.

\* \* \* \* \*